US007080715B1

(12) United States Patent
Bowlin

(10) Patent No.: US 7,080,715 B1
(45) Date of Patent: Jul. 25, 2006

(54) PORTABLE BODY SUPPORT APPARATUS FOR AUTOMOTIVE MECHANICS

(76) Inventor: Jerry M. Bowlin, 530 E. 7th Ave., Belle Plaine, KS (US) 67013

( * ) Notice: Subject to any disclaimer, the term of this patent is extended or adjusted under 35 U.S.C. 154(b) by 91 days.

(21) Appl. No.: 10/958,479

(22) Filed: Oct. 5, 2004

(51) Int. Cl.
*E06C 5/32* (2006.01)
*E06C 7/16* (2006.01)
*B62B 11/00* (2006.01)

(52) U.S. Cl. .................... 182/129; 182/116; 280/32.6; 280/32.5

(58) Field of Classification Search ................ 182/116, 182/152, 129, 156, 131, 132, 127, 230; 280/32.6, 280/32.5; 297/423.1, 423.11, 423.12; 108/106, 108/146, 144.11, 147.21; 248/129
See application file for complete search history.

(56) References Cited

U.S. PATENT DOCUMENTS

| | | | | |
|---|---|---|---|---|
| 2,701,168 | A * | 2/1955 | Schemers | 182/116 |
| 2,872,252 | A * | 2/1959 | Konkle | 182/131 |
| 2,967,123 | A * | 1/1961 | Jamerson et al. | 182/116 |
| 3,552,521 | A * | 1/1971 | Tate | 182/129 |
| 3,976,155 | A * | 8/1976 | Esch | 280/32.5 |
| 4,072,209 | A * | 2/1978 | Bolis | 182/116 |
| 4,397,374 | A * | 8/1983 | Rumage et al. | 182/129 |
| 4,530,419 | A * | 7/1985 | Rumage et al. | 280/32.5 |
| 4,542,806 | A * | 9/1985 | Olson | 182/116 |
| 4,618,029 | A * | 10/1986 | Lowry | 182/116 |
| 4,727,958 | A * | 3/1988 | Botello | 182/116 |
| 5,072,955 | A * | 12/1991 | Holland et al. | 280/32.5 |
| 5,255,757 | A * | 10/1993 | Horowitz et al. | 182/127 |
| 5,899,297 | A * | 5/1999 | Clark | 280/32.5 |
| 6,105,719 | A * | 8/2000 | Lensing | 182/116 |
| 6,199,877 | B1 * | 3/2001 | Shockley | 280/32.6 |
| 6,540,301 | B1 * | 4/2003 | Bottoms | 297/423.11 |
| 6,595,590 | B1 * | 7/2003 | Bottoms | 297/423.11 |
| 6,641,146 | B1 * | 11/2003 | Reese | 280/32.6 |
| 6,926,365 | B1 * | 8/2005 | Bottoms | 297/423.12 |

* cited by examiner

*Primary Examiner*—Hugh B. Thompson, II

(57) ABSTRACT

An auto mechanic's body support apparatus is a portable framework made of steel or other durable materials attached to which are a horizontally adjustable step platform and a horizontally and vertically adjustable chest bench rest. A pair of wheels underneath one end of the base allow the apparatus to be easily rolled forward and backward. The length of the base parallel support rails is designed so as to enable the apparatus to be positioned well under the vehicle, thereby providing a high degree of balance and stability during use. The body support bench provides a comfortable, supportive and stable work environment for a mechanic working on a vehicle engine.

3 Claims, 2 Drawing Sheets

PORTABLE BODY SUPPORT APPARATUS FOR AUTOMOTIVE MECHANICS

FIELD OF THE INVENTION

A portable body support apparatus for automotive mechanics is comprised of a step platform and chest bench rest which are adjustable. The device provides a comfortable, supportive and a stable work environment for a user working under the engine hood of a vehicle.

BACKGROUND

The work of auto mechanics is well known to be physically awkward and demanding. The mechanic's work frequently results in strain and injury to wrists, elbows, upper and lower back, and the spine. Mechanics are required to stand for long periods of time, and to kneel, stoop, crouch, or crawl while inspecting and repairing cars. They must often bend or twist the body while making repairs, particularly while stretched over an open engine well. And, they must repeat the same movements over and over.

Auto mechanics are well known to experience the results of cumulative trauma in their trade. Long hours of working in awkward static postures creates numerous problems. Mechanics must learn forward while working under the hood of a vehicle, which often results in lower back strain and injury. Many of the motions made by mechanics cause the worker's body to be prone to trauma. For example, tightening or removing parts that require excessive torque forces are known to cause cumulative trauma to upper extremities.

The mechanic's body is forced to conform to a wide range of engine configurations and vehicle designs. While on one hand the average size of vehicles has increased significantly with the growing popularity of Sports Utility Vehicles (SUV's), on the other hand, auto makers are also producing vehicles designed to be more compact, with engines designed to fit in very confined spaces. As a result, auto mechanics face the challenging task of adapting to a wide range of physically demanding work environments, endeavoring to "fit the human to the task".

Various tactics are employed by mechanics in an attempt to alleviate the physical strain of such work. Some individuals wear back braces that help to support the lower back while keeping the torso more rigid and straight. Mechanics often use protective coverings which are laid over the vehicle's body to protect it from grease and damage, and such coverings are often padded to help support the mechanic's upper body.

Mechanics often set their workstation up in such a way that tools and auto parts may be reached quickly and easily, without undue effort or motion. Utility carts and tool racks on casters are typically used, allowing the mechanic to position his tools where they are easiest to use. Gaining easy access to tools and parts, or easily setting aside parts that have been removed from an engine, is known to eliminate postures that create cumulative trauma injuries.

One of the tools employed by mechanics is known as an 'overhead creeper'. The creeper is an aid to working on engine parts that are difficult to reach under the hood of a vehicle, having a padded chest board that is supported on top of a ladder-like apparatus. While standing on the ladder, the mechanic lies prone on the board in a position over the engine. Various other attempts have been made to design devices that will alleviate the above-described problems.

PRIOR ART

Prior art is found wherein various 'creepers' and workbench designs are intended to provide support for one working on a vehicle's engine area. For example, art is found wherein a mechanic's body support apparatus is comprised of an H-shaped frame having an attached support platform with knee and chest supports. The apparatus is mobile, having four wheels attached to the underside of the frame. Such design has a single vertical support bar, which does not provide stability equal to a device with dual support bars. In addition, all four wheels must be placed in a locked position in order for the apparatus to be secured for use, whereas a device having wheels at only one end of the device's undercarriage is secured by having its opposite end resting directly on the ground.

Other art is found wherein a workbench design has two vertical support bars, between which are attached a support platform for the knees and a support platform for the chest. The chest platform is supported by side rails that are attached to, and movable in relation to, the vertical side support bars. One such design does not have wheels, and must therefore be manually lifted and set into place. A similar design is found in the art wherein an apparatus has four wheels which must be placed in a locked position in order for the apparatus to be secured. Unfortunately, both such designs provide less support for the user's weight and movement than does a design wherein the chest platform is attached directly to the frame's primary side support rails.

Yet other art is found wherein a T-shaped mobile frame is designed for a mechanic to either stand on or lie on. Given that the device's base serves as its standing platform, it is not possible to vertically adjust the standing platform, thereby limiting the user's standing height on the apparatus. Such design also has four wheels which must be locked in order for the apparatus to be secured.

Still other art is found wherein a mechanic's platform is comprised of a tubular base and frame which are pivotally connected to one another. A cover placed over the uppermost portion of the frame serves as a chest platform. Unfortunately, such design does not provide a flat, stable standing platform, but requires the user to balance his feet on tubular railing.

Therefore, what is desired and has not heretofore been provided, and is herein disclosed, is a mechanic's body support apparatus that is easily portable, highly stable and ergonomically comfortable, having an adjustable height flat foot platform and a vertically adjustable chest bench rest.

SUMMARY

Therefore in recognition of the need for a portable bench to support an automotive worker's body while working on engines, herein is disclosed a mechanic's bench apparatus made of steel or other durable material which is comprised of the following elements: (1) a metal support base comprised of two parallel support rails which are joined to (2) a horizontal support crossbar at a point approximately two-thirds along the length of the support rails; (3) two wheels, attached to one end of each support rail, enable the device to be rolled forwards and backwards; (4) a frame comprised of two vertical side rails, the bottom end of which are attached to the base's parallel support rails at a point perpendicular to the horizontal support crossbar; (5) a plurality of holes positioned along the mid-section of the vertical side rails into which are inserted (6) a plurality of bolts or other latching mechanisms which secure and enable the horizontal adjustment of (7) a horizontal standing platform which is comprised of a metal base having a non-skid surface, the base having two angled metal side supports between which is attached (8) a horizontal support crossbar. At their uppermost end, the vertical side rails are bent at a 90 degree vertical angle so as to allow the (9) bench rest to be easily positioned above the vehicle's engine area, the bench rest, being a rectangular platform that is padded with a grease/oil resistant material like rubber or plastic, is positioned horizontally between and is attached to the uppermost angled portion of the vertical side rails, being attached thereto by (10) a plurality of bolts or other latching mechanisms which enable the bench rest to be adjusted both vertically and horizontally.

The invention will be seen to have several benefits and advantages. One advantage is that the base's parallel support rails are designed to slide well underneath the vehicle, thereby providing ample stability to ensure the user's balance and safety while he is mounted on the apparatus.

Another advantage of the device is that the device's bench rest may be adjusted horizontally and vertically.

Yet another advantage is that the device's standing platform may be adjusted horizontally.

And another advantage is that the device's bench rest and standing platform may be adjusted independently of one another.

Yet another advantage is that the design's flexibility of adjustment allows user to optimally adjust the device so as to fit their personal body ergonomics in relation to the particular type of vehicle they are working on.

Still another advantage is the user can quickly and easily mount and dismount the apparatus.

And yet another advantage is that the wheeled support base enables the device to be easily moved forwards and backwards.

And an eighth advantage is that because wheels are attached to the device at only one end of the base, the apparatus remains secured from rolling due to being supported flat on the ground at the opposite end of the base.

And still another advantage is that the apparatus helps to protect the vehicle from being dented, soiled by grease, or otherwise damaged by movements of the mechanic and his tools.

Yet another advantage is that the device's design and material allow for easy clean-up.

These benefits and advantages will become apparent in the description and drawings that follow.

DETAILED DESCRIPTION

Figure 1:
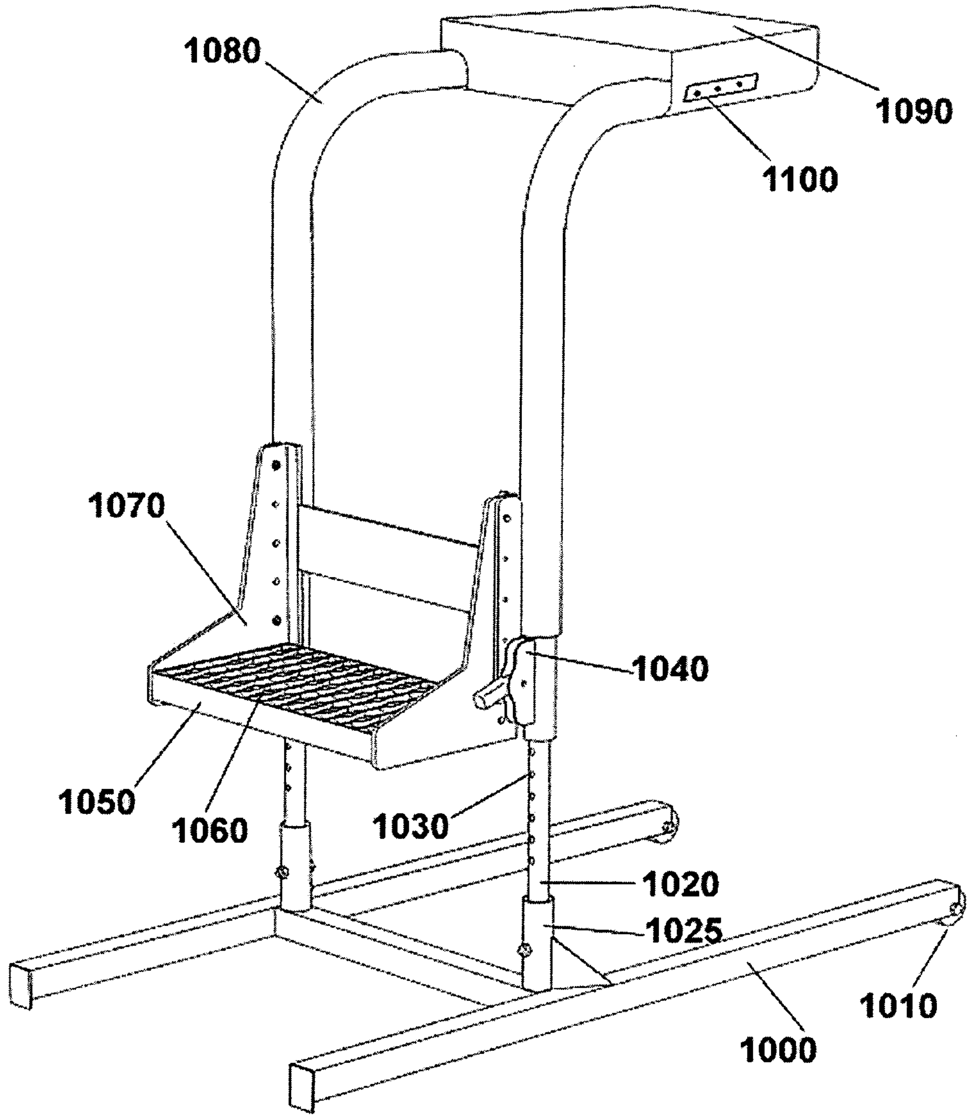
FIG. 1 shows a side view of the apparatus.

Herein is disclosed a portable body support apparatus. With reference to FIG. 1, a side view of the apparatus, a metal support base comprised of two parallel support rails 1000 at one end of which are attached two wheels 1010; a frame comprised of two vertical side rails 1020, the bottom end of which are attached 1025 to the base's parallel support rails 1000; a plurality of holes 1030 positioned along the mid-section of the vertical side rails 1020 into which are inserted a plurality of bolts or other latching mechanisms 1040 which secure and enable the horizontal adjustment of a horizontal standing platform 1050 which is comprised of a metal base having a non-skid surface 1060, the base having two angled metal side supports 1070; at their uppermost end, the vertical side rails are bent at a 90 degree vertical angle 1080; a bench rest 1090, being a padded rectangular platform, is positioned horizontally between and is attached to the uppermost angled portion of the vertical side rails 1080, being attached thereto by a plurality of bolts or other latching mechanisms 1100 which enable the bench rest to be adjusted both vertically and horizontally.

Figure 2:
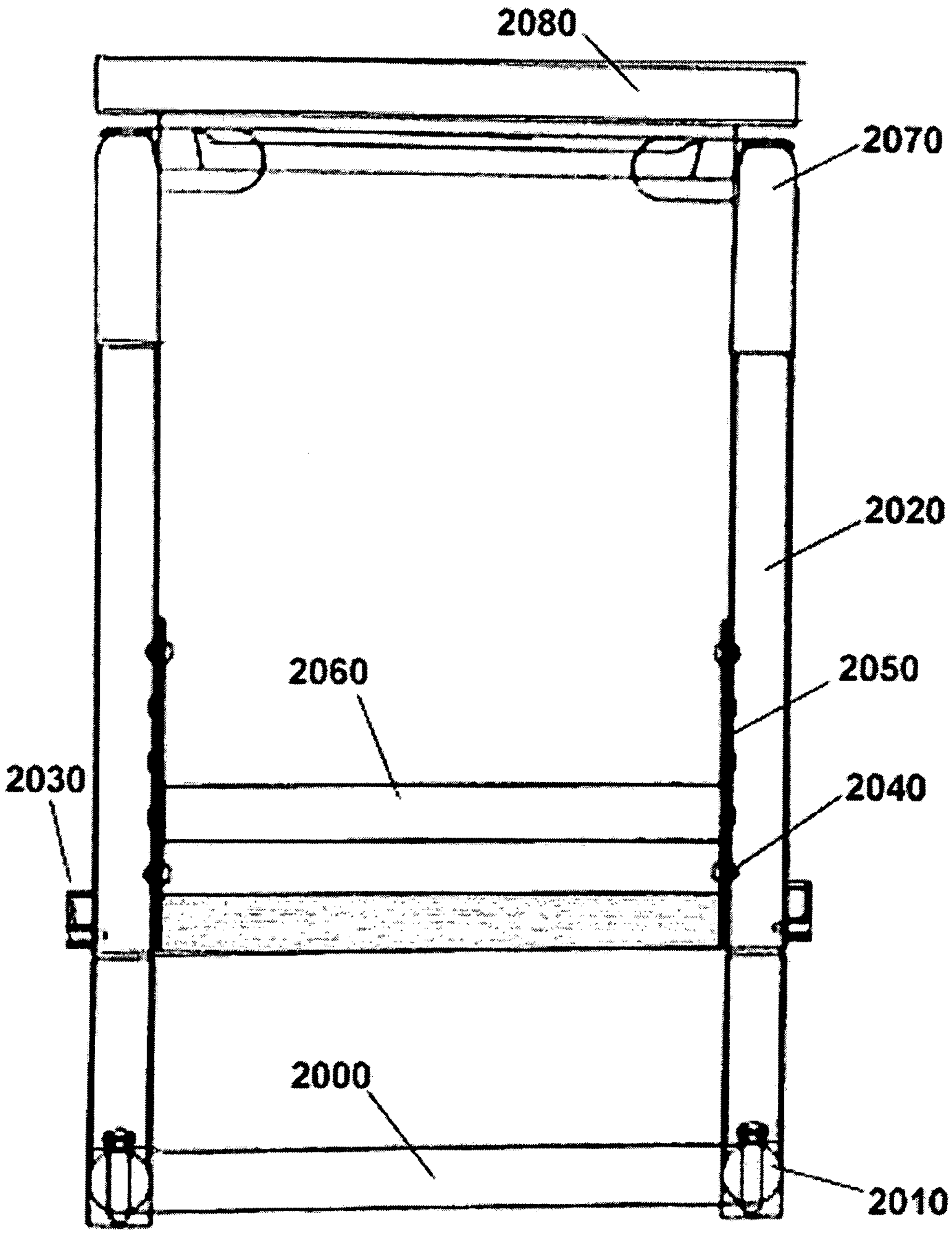
FIG. 2 shows a rear view of the apparatus.

With reference to FIG. 2, a rear view of the apparatus, a horizontal support crossbar 2000 positioned between and attached to two parallel support rails, at one end of which two wheels 2010 are attached, and above which are positioned two vertical side rails 2020 which are attached to the base perpendicular to the horizontal support crossbar 2000. A horizontal standing platform 2030 is attached to the vertical side rails 2020 by means of a plurality of holes through which bolts or other latching mechanism 2040 attach the angled metal side supports 2050 of the standing platform 2030 to the vertical side rails 2020. Positioned above the standing platform 2030, between and attached to the vertical side rails 2020, a horizontal support crossbar 2060 provides additional support for the standing platform 2030. At their uppermost end, the vertical side rails are bent at a 90 degree vertical angle 2070 so as to allow the padded chest bench rest 2080, which is positioned horizontally between and is attached to the uppermost angled portion of the vertical side rails 2070, to be easily positioned over the work area.

What is claimed is:

1. A portable bench to support an automotive worker, comprising:

- a support base having two parallel support rails joined to a horizontal support crossbar;
- two wheels attached to one end of each support rail;
- a frame comprised of two side rails which are attached to the base's parallel support rails at a point perpendicular to the horizontal support crossbar, the side rails having a plurality of holes into which are inserted bolts or other latching mechanisms;
- a horizontal standing platform having a metal base with a non-skid surface and two angled side supports, the platform being horizontally adjustable between the side rails;
- a horizontal support crossbar positioned between the standing platform's angled side supports at a position above the standing platform; and,
- a vertically and horizontally adjustable padded bench rest positioned horizontally between the side rails, being attached by means of a plurality of bolts or other latching mechanisms at an uppermost end of the side rails, which are bent at a 90 degree vertical angle.

2. The device of claim 1, wherein the base parallel support rails are of a sufficient length so as the base may be positioned well under a vehicle.

3. The device of claim 1, wherein the bench rest and standing platform may be adjusted independently of one another.

* * * * *